United States Patent
Ohja et al.

[19]

[11] Patent Number: 6,083,843
[45] Date of Patent: Jul. 4, 2000

[54] METHOD OF MANUFACTURING PLANAR LIGHTWAVE CIRCUITS

[75] Inventors: Sureshchandra Mishrilal Ohja, Harlow; David John Moule, Old Harlow; Colin Brian Rogers, Bishops Stortford, all of United Kingdom

[73] Assignee: Northern Telecom Limited, Quebec, Canada

[21] Appl. No.: 08/991,334

[22] Filed: Dec. 16, 1997

[51] Int. Cl.[7] .................................................. H01L 21/306

[52] U.S. Cl. ........................ 438/710; 438/710; 438/715; 438/717; 438/723; 156/643; 156/647

[58] Field of Search ..................................... 438/710, 715, 438/717, 723; 156/643, 647

[56] References Cited

U.S. PATENT DOCUMENTS

| | | | |
|---|---|---|---|
| 5,217,568 | 6/1993 | Tessier et al. | 156/659.1 |
| 5,342,478 | 8/1994 | Welbourn | 156/643 |
| 5,471,552 | 11/1995 | Wuu et al. | 385/49 |

*Primary Examiner*—Benjamin Utech
*Assistant Examiner*—Lan Vinh
*Attorney, Agent, or Firm*—Malin, Haley & DiMaggio, P.A.

[57] ABSTRACT

The present invention is an improved method of pigtailing of high-density Wavelength Division Multiplex (WDM) components, achieved by etching silicon V-grooves for locating the fibres after completion of the PLC device fabrication processes. This avoids the need for etching or pre-patterning of the V-grooves on substrates before device fabrication, and hence avoids any of the waveguide to fibre alignment problems that have been found in the methods of the prior art.

11 Claims, 3 Drawing Sheets

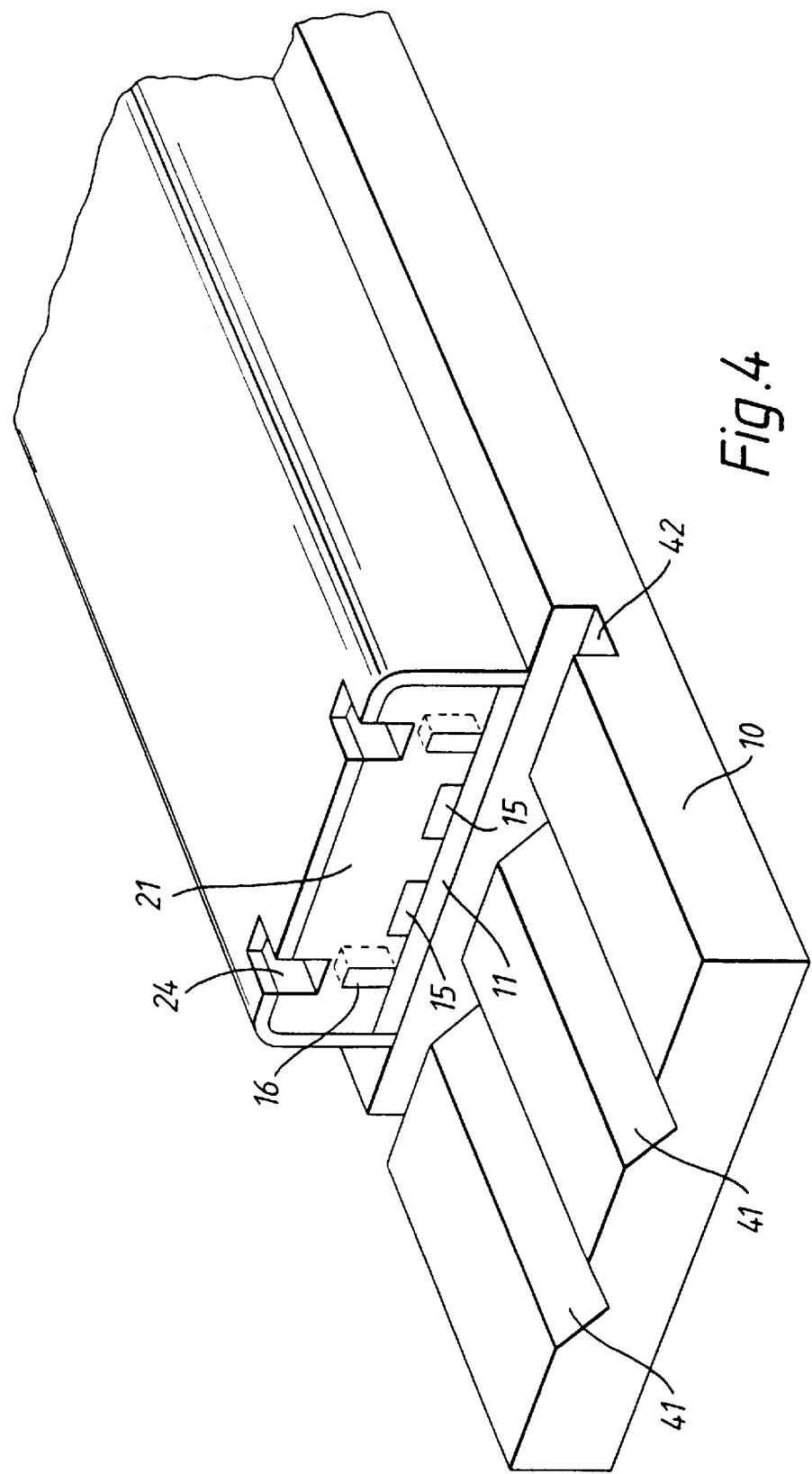

METHOD OF MANUFACTURING PLANAR LIGHTWAVE CIRCUITS

BACKGROUND OF THE INVENTION

The present invention relates to a method of manufacturing Planar Lightwave Circuits, and more particularly to a method of manufacturing whereby V-grooves etched in a substrate are aligned with a planar waveguide core deposited on the substrate.

It is known that planar waveguide devices fabricated on a silicon substrate may be fibre pigtailed by using integrated V-grooves etched on the substrate. The optic fibre is positioned so as to lie within the V-groove and is thus guided by the groove into alignment with the waveguide core. The V-groove must be precisely aligned laterally and vertically with the waveguide core to allow for effective optical power transfer between the fibre and the core.

Several methods of aligning the V-groove with the waveguide core are known from the prior art. EP 0762 162 discloses a method in which a single lithographic mask forms and laterally aligns both the waveguide core and the V-groove simultaneously during the same manufacturing process. The single mask has laterally aligned waveguide and V-groove portions and is used to pattern a core glass layer to form the waveguide core and to define the location of the V-groove. The V-groove is then formed completely using conventional etching techniques. Unfortunately, due to inaccuracies which occur within the lithographic process it has been found that the technique is unable to provide the desired accuracy for precise alignment of the fibre core with the waveguide core.

A further method is described by Day et al. in *Electronics Letters* vol. 28 p. 920–22, 1992 in which the V-grooves are etched prior to the deposition of any oxide cladding layers, and then the waveguides are aligned to the V-grooves during the patterning of the core layer. This approach suffers from the drawback that oxide deposition is required on both the front and back of the wafer. This deposition process is an extra processing step which is both time consuming and prone to particle contamination, thus lowering the yield of the devices.

SUMMARY OF THE PRESENT INVENTION

The present invention overcomes the problems of the prior art by providing precise lateral and vertical alignment of the V-grooves with the waveguide core without the need for extra process steps in the form of etching or prepatterning of the substrate before the fabrication of the devices.

According to the present invention, there is provided a method of forming one or more integrated V-grooves in a substrate in alignment with one or more waveguide cores formed on said substrate as part of a planar light circuit device, comprising the steps of;

forming said waveguide cores and one or more registration marks on the surface of an undercladding layer;

transferring said registration marks onto the surface of an overcladding layer as notches, wherein said registration mark notches are in vertical alignment with said registration marks; and forming said V-grooves using said registration mark notches as references to ensure lateral and vertical alignment of said V-grooves with said waveguide cores;

wherein fabrication of the waveguide is completed prior to forming the V-grooves so that said V-grooves are formed in the substrate as the last process step in the fabrication of the planar light circuit device.

Consequently the present invention provides one or more physical reference marks in each and any of the waveguide core or oxide cladding layers wherein the reference marks in each subsequent layer are in registration with those of previous layers and can be used to ensure that subsequent lithographic masks are in precise registration and alignment with the etched pattern from any previous masks.

This advantage of the present invention in allowing the delineation of the V-grooves to take place after the fabrication of the PLC device has been completed ensures that precise alignment of the V-grooves with the waveguide cores may be achieved. This provides benefits in the form of reducing the complexity of the process steps required to fabricate the PLC device, and allowing the V-groove method of fibre pigtailing to be used with existing PLC devices without the need for extensive modifications to existing lithographic masks, and to current device fabrication process flows.

There is also a further advantage in delineating the V-grooves last in that the waveguide has by this stage been completed and thus there is no risk of device contamination occurring during the V-groove fabrication stage. This increases the overall device yield by reducing the number of process steps, and provides for even further improvements in the device manufacturing process in that the V-groove fabrication step need only be applied to those devices which have been tested and found to perform satisfactorily.

The reference marks may be square- or cross-shaped, or of any other shape which allows for unambiguous alignment of subsequent lithographic masks with the etched pattern from previous masks.

In the case where a plurality of registration marks are created, each of the marks may be so spaced and in an angular orientation with respect to each other such that there is provided a unique alignment position for all lithographic masks with the reference marks so as to ensure precise registration from mask to mask throughout the device fabrication process.

BRIEF DESCRIPTION OF THE DRAWINGS

Further features and advantages of the present invention will become clear from the following description, and with reference to the following figures wherein like numbers in each figure refer to like features of the invention:

FIG. 4 shows an isometric view of the position of the V-grooves on the substrate after etching.

DESCRIPTION OF THE PREFERRED EMBODIMENT

The present invention is an improved method of pigtailing of high-density Wavelength Division Multiplex (WDM) components, achieved by etching silicon V-grooves for locating the fibres after completion of the PLC device fabrication processes. This avoids the need for etching or pre-patterning of the V-grooves on substrates before device fabrication, and hence avoids any of the waveguide to fibre alignment problems that have been found in the methods of the prior art.

Figure 1A:
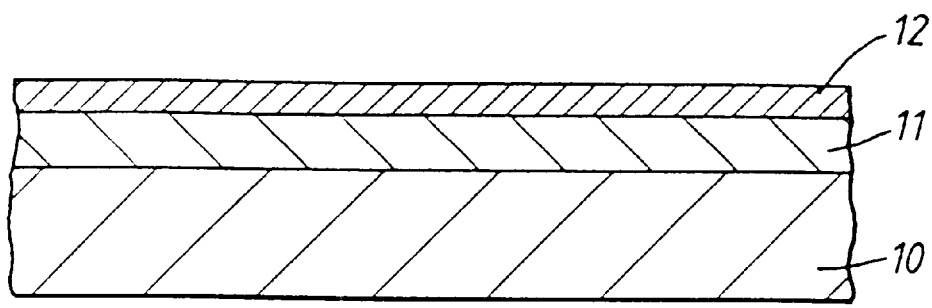
FIGS. 1*a*, *b* and *c* shows a schematic of the process steps required to provide the waveguide core and the initial reference marks.
Figure 1B:
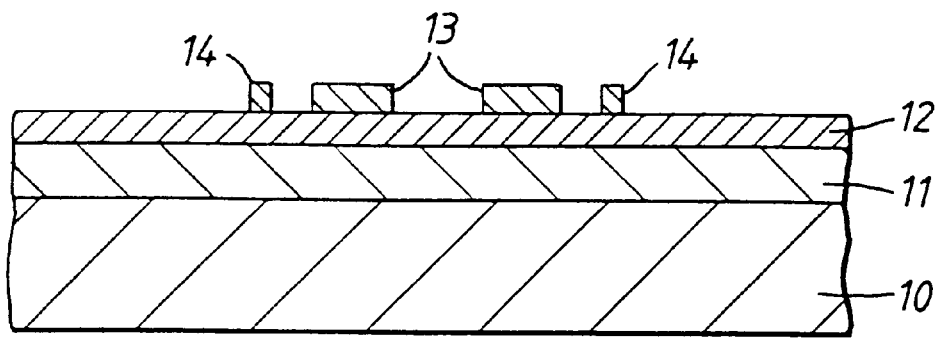
Figure 1C:
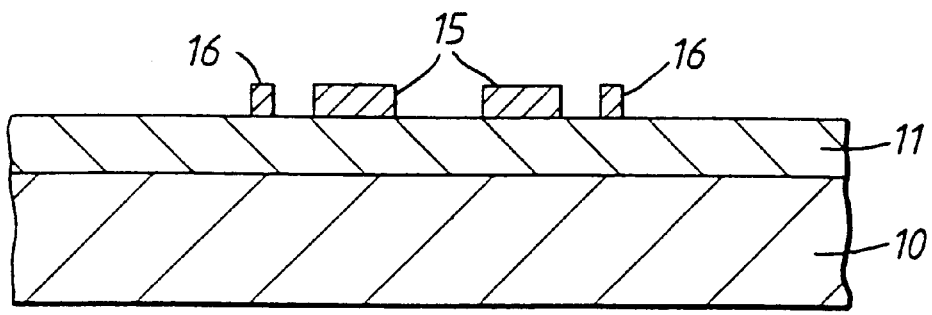

With reference to FIG. 1, a silicon wafer substrate 10 is heated so as to form a thermally grown oxide 11 which acts as the undercladding layer of the waveguide to be formed, and is of refractive index $n_1$. Following the growth of the undercladding layer, a waveguide core layer of known refractive index $n_2$ is deposited onto the wafer forming an even layer 12 over the undercladding. The core layer is fabricated from such a material so that it's refractive index $n_2$ is higher than that of the refractive index $n_1$ of the undercladding.

Following the core layer deposition, a layer of photoresist is spun on top of the core layer and exposed using a suitably patterned lithographic mask so as to leave resist in an appropriate pattern that both delineates the waveguide cores (13), and also defines reference marks (14) within the core layer that are used to ensure correct registration from each lithographic mask to the next in each stage of the device fabrication process. The reference marks may be of any suitable shape which allow for unambiguous alignment of subsequent lithographic masks with the pattern etched on the wafer from previous masks, but in the present preferred embodiment it was found that square or cross shapes were particularly suitable. It is also to be understood that while photolithography has been used within the preferred embodiment, other lithographic methods such as electron beam lithography and X-ray lithography may also be used allowing for the appropriate changes in mask design that would be required.

After defining the core and registration mark patterns on the core layer, the rest of the core is etched away by reactive ion etching (RIE), leaving the waveguide cores 15 and the registration marks 16 as heights on the undercladding surface.

Figure 2A:
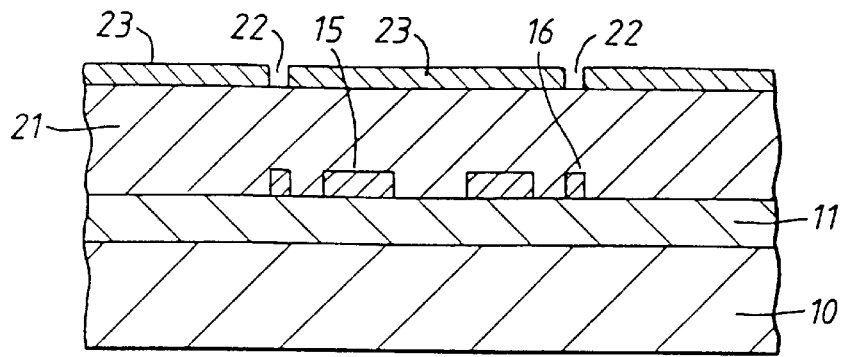
FIGS. 2*a* and *b* shows a schematic of the process of transferring the reference marks through subsequently deposited layers while maintaining the registration with the initial marks.
Figure 2B:
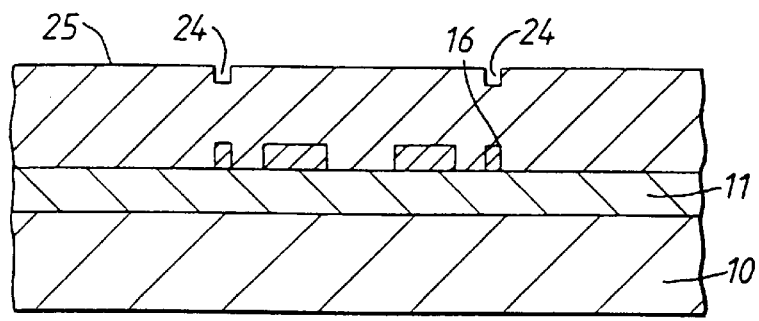

An overcladding layer of oxide 21 is grown over the core and registration marks as shown in FIG. 2. This layer has a refractive index $n_1$ which is different from the refractive index $n_2$ of the waveguide core, but same as the index of the undercladding layer and is sufficiently translucent so as to allow the registration marks 16 to be visible when viewed from above. A layer of photoresist 23 is spun on the surface of the overcladding and exposed using a mask containing alignment marks which overlay the registration marks 16 visible through the overcladding 21, thus removing the resist precisely in registration with the marks, as shown by the notches 22. The wafer is then subjected to reactive ion etching and approximately 0.5 micron is etched from the exposed parts of the overcladding, thus providing the notches 24 in the surface of the overcladding 25. The notches 24 are in precise registration with the registration marks 16, effectively transferring the registration marks onto the overcladding layer, and obtaining the same shape as the registration marks 16.

Figure 3A:
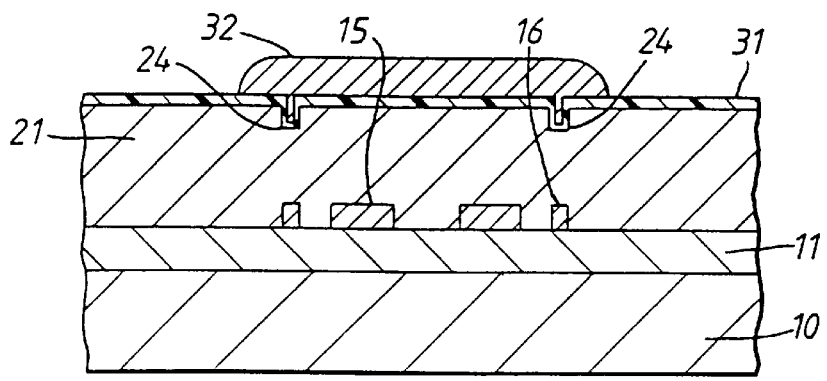
FIGS. 3*a* and *b* shows a schematic of the process of acid etching of the oxide overcladding.
Figure 3B:
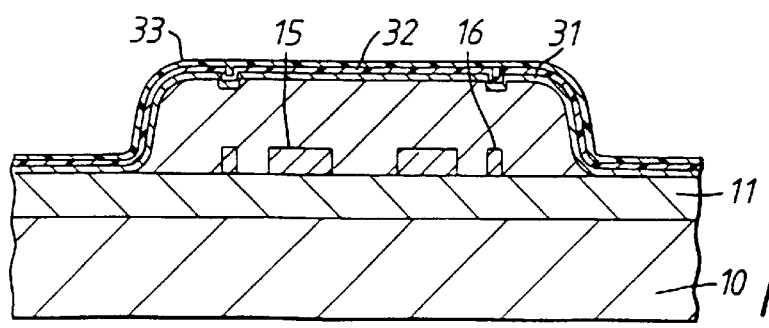

Following etching of the reference notches within the overcladding, a polysilicon film 31 is deposited upon the surface of the overcladding 21, and extends to provide a layer over the whole upper surface of the wafer, as shown in FIG. 3. This polysilicon film is used as a protection layer for the device during the next BHF acid etching stage.

A resist 32 is deposited over the wafer to delineate the area of the device, and then BHF acid etching is used to remove the oxide overcladding from the edges of the wafer and from the areas in front of the input and output waveguide cores where the V-grooves are to be defined. A thin film of silicon nitride 32 is then deposited upon the device using low pressure chemical vapour deposition (LPCVD) or plasma enhanced chemical vapour deposition (PECVD) techniques, followed by a layer of titanium of an order of magnitude less in thickness than the film of silicon nitride. The purpose of the titanium is to provide a conducting path to an earth to prevent surface charging of the wafer during the subsequent electron beam exposure for patterning the V-grooves. Electron beam sensitive resist 33 is then spun on the wafer for e-beam patterning.

The V-grooves may now be patterned on the resist in the areas of the wafer in front of the input and output waveguide cores where the oxide cladding layers were removed by the BHF acid etch. With reference to FIG. 4, the registration marks 24 on the cladding layer are used for pattern recognition by the electron beam, so as to expose resist precisely in lateral alignment with the waveguide cores to define the areas where the V-grooves are to be etched. Vertical alignment of the optical fibres with the waveguide cores is ensured by accurately defining the widths of the V-grooves so as to produce grooves of predetermined depth for locating the fibre. It is to be understood that while pattern recognition of the registration marks 24 by the electron beam is used for alignment of the V-grooves with the cores in the preferred embodiment, other suitable methods of patterning the a photoresist using the registration marks for alignment may be used, such as using a projection aligner or stepper.

The titanium and silicon nitride layer exposed by the patterning of the resist is etched by reactive ion etching to expose the underlying silicon substrate, and the remaining electron beam resist is removed. The wafer is then placed in a solution of potassium hydroxide, isopropyl alcohol and de-ionised water for etching the V-grooves. This etch is crystallographic selective and etches along the 111 plane and comes to a stop when the exposed 111 planes are completely etched, thus forming the V-grooves 41 in the substrate 10 as shown. A transverse channel 42 is also provided in any convenient fashion e.g. by means of a saw cut.

The present invention provides a method of ensuring precise and accurate passive alignment of integrated V-grooves with planar waveguide devices such as demultiplexers, optical switches, splitters and other integrated optical components for use in a wide variety of applications such as WDM, optical signal processing and optical computing. While the description of the preferred embodiment of the invention specifies certain integrated device fabrication processes for use in each stage, it is to be understood that the method of the present invention is not to be limited to those processes named in themselves, and that other known or future processes of comparable effect may be substituted for the processes named herein. In particular the photo lithographic processes used in the preferred embodiment may be substituted for any other comparable lithographic processes, such as electron beam or X-ray lithographic processes. Similarly, the thin film deposition processes used such as the low pressure or plasma enhanced chemical vapour deposition processes may be replaced by other comparable thin film deposition processes, and in particular other chemical vapour deposition or flame hydrolysis techniques.

In addition to the above allowances, it is to be further understood that the present invention is to be taken to include any future method of manufacturing planar light circuits by any comparable future manufacturing process using alignment marks which are transferred from layer to layer. This will be especially the case where alignment marks formed upon the lower layers of a device may be transferred onto each subsequent layer in each stage of the manufacturing process in registration with each other by virtue of the translucent properties of each layer, and wherein the alignment marks are used to form integrated features in precise alignment with features of the device and upon the same substrate as the last process step in the fabrication of the device.

We claim:

1. A method of forming one or more integrated V-grooves in the surface of a silicon wafer substrate in alignment with one or more waveguide cores formed on said substrate as part of a planar lightwave circuit device, the method comprising the steps of:

(a) forming on a pristine surface of the silicon wafer an undercladding layer;

(b) directly following said formation of the undercladding layer with the deposition upon the undercladding layer of a core layer;

(c) directly following said deposition of the core layer with processing to remove areas of the core layer, said areas being configured to leave remaining regions of core layer constituting said waveguide cores together with one or more additional regions constituting registration marks;

(d) directly following said removal of areas of the core layer with the deposition, to cover the waveguide cores and registration marks, of an overcladding layer;

(e) creating registration notches in the overcladding layer in vertical alignment with the registration marks; and (f) forming said V-grooves by processing using said registration notches to position said V-grooves in lateral alignment with said waveguide cores.

2. A method according to claim 1 wherein said undercladding layer is formed on the pristine surface of said wafer by heating at least the pristine surface of said wafer to form a thermally grown oxide layer thereon as said undercladding layer.

3. A method according to claim 1, wherein said processing step (c) further comprises the steps of:

patterning said core layer to define said areas of said core layer to be removed;

etching said core layer to remove said areas to leave said regions constituting said waveguide cores and said additional regions constituting registration marks; and said additional regions being characterized by being of such shape and/or positioning so as to allow subsequent process steps to use said registration marks for unambiguous alignment of said silicon wafer.

4. A method according to claim 1, wherein said notch creating step (e) further comprises the steps of:

patterning said overcladding layer to define notch areas in vertical alignment with said registration marks; and etching said notch areas to create said registration notches in said overcladding layer, said notches extending into said overcladding layer to a depth less than the thickness of said overcladding layer, and being further arranged so as to be of substantially identical shape to said registration marks.

5. A method according to claim 1, wherein said V-groove formation step (f) further comprises the steps of:

patterning the overcladding layer to define a device are delineating the planar lightwave circuit device;

etching the overcladding layer, the core layer and the undercladding layer to remove said layers in a region outside the device area to expose the silicon wafer substrate;

patterning the silicon wafer substrate to define V-groove areas where said V-grooves are to be formed, using said registration notches to position said V-groove areas in lateral alignment with said waveguide cores; and etching said V-groove areas to form said V-grooves.

6. A method according to claim 1, wherein vertical alignment of the V-grooves with the waveguide cores is ensured by precisely controlling the width of the formed V-grooves to produce grooves of predetermined depth for accurately aligning optic fibers confined along the length of the V-grooves with the repective waveguide cores.

7. A method according to claim 3, wherein said core layer patterning strip is performed using photolithography, and said core layer etching step is performed using reactive ion etching.

8. A method according to claim 4, wherein said notch area patterning step is performed using photolithography, and said notch area etching step is performed using reactive ion etching.

9. A method according to claim 5, wherein said silicon wafer substrate patterning step further comprises:

depositing electron-beam sensitive resist on the surface of the silicon substrate;

exposing said resist with an electron beam using the registration notches to allow control of said beam to expose resist in lateral alignment with the wave guide cores to define said V-groove areas; and wherein said V-groove etching step further comprises: crystallographically selective etching the V-groove areas defined by said exposed resist to form said V-grooves.

10. A method according to claim 9, wherein said crystallographically selective etching is performed by immersing the silicon wafer in a solution containing potassium hydroxide.

11. A method according to claim 5, wherein said overcladding patterning step is performed using a lithodgraphic patterning process, and said cladding etching step is performed during and acid etch.

* * * * *